US012146422B2

(12) United States Patent
Maddaleno et al.

(10) Patent No.: US 12,146,422 B2
(45) Date of Patent: Nov. 19, 2024

(54) GAS TURBINE ENGINE INCLUDING A ROTATING BLADE ASSEMBLY

(71) Applicant: GE Avio S.r.l, Rivalta di Torino (IT)

(72) Inventors: Roberto Maddaleno, Lanzo Torinese (IT); Matteo Renato Usseglio, Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/888,539

(22) Filed: Aug. 16, 2022

(65) Prior Publication Data

US 2023/0167745 A1 Jun. 1, 2023

(30) Foreign Application Priority Data

Nov. 26, 2021 (IT) ........................ 102021000029963

(51) Int. Cl.
*F01D 5/30* (2006.01)
*F01D 5/22* (2006.01)

(52) U.S. Cl.
CPC ........... *F01D 5/3053* (2013.01); *F01D 5/225* (2013.01); *F01D 5/3015* (2013.01); *F01D 5/3069* (2013.01); *F05D 2220/32* (2013.01); *F05D 2230/60* (2013.01); *F05D 2240/30* (2013.01)

(58) Field of Classification Search
CPC .......... F01D 5/03; F01D 5/225; F01D 5/3015; F01D 5/3023; F01D 5/303; F01D 5/3036; F01D 5/3038; F01D 1/26
USPC ....................................................... 416/214 A
See application file for complete search history.

(56) References Cited

U.S. PATENT DOCUMENTS 876,971 A * 1/1908 Junggren .............. F01D 5/3038 416/215
1,118,361 A * 11/1914 Lasche ...................... F01D 5/06 416/214 R
1,466,324 A * 8/1923 Wilkinson ............ F01D 5/3038 416/215
2,220,918 A 11/1940 Smith
2,401,826 A * 6/1946 Frank ...................... F01D 5/087 416/214 R
2,435,427 A * 2/1948 Eastman ............... F01D 5/3069 416/217
2,684,831 A * 7/1954 Grantham ............ F01D 5/3015 416/214 A
2,819,869 A 1/1958 Meyer, Jr.
(Continued)

FOREIGN PATENT DOCUMENTS

CH 377589 A 5/1964
DE 3836231 C1 * 10/1989
(Continued)

*Primary Examiner* — Topaz L. Elliott
(74) *Attorney, Agent, or Firm* — McGarry Bair PC

(57) ABSTRACT

A rotating blade assembly for a turbine engine having a drive shaft, the rotating blade assembly comprising a disc, at least one blade assembly, and a retainer. The disc being operably coupled to the drive shaft and including a seat having at least a portion of a first through hole. The at least one blade assembly having an upper platform, a lower platform, a dovetail extending from the lower platform, and a blade extending between the upper platform and the lower platform. The retainer assembly securing the disc to the at least one blade assembly and comprising a hollow tubular element, a pin, and a fastener.

20 Claims, 9 Drawing Sheets

(56) References Cited

U.S. PATENT DOCUMENTS

| | | | | | |
|---|---|---|---|---|---|
| 3,014,695 | A | | 12/1961 | Rankin et al. | |
| 3,055,633 | A | * | 9/1962 | Pouit | F01D 5/08 416/214 R |
| 4,076,455 | A | | 2/1978 | Stargardter | |
| 4,097,194 | A | * | 6/1978 | Barack | F01D 5/021 416/214 A |
| 4,098,559 | A | * | 7/1978 | Price | F01D 5/34 416/241 A |
| 4,102,603 | A | * | 7/1978 | Smith | F01D 5/087 416/244 A |
| 4,767,270 | A | * | 8/1988 | Seidel | F02K 3/072 416/129 |
| 5,102,302 | A | * | 4/1992 | Schilling | F01D 5/3053 416/134 A |
| 5,405,244 | A | * | 4/1995 | Boyd | F01D 5/3069 416/214 A |
| 5,409,353 | A | | 4/1995 | Imbault | |
| 7,134,841 | B2 | * | 11/2006 | Montgomery | F01D 5/081 416/1 |
| 7,442,011 | B2 | | 10/2008 | Negulescu et al. | |
| 8,459,953 | B2 | | 6/2013 | Haffner | |
| 9,175,571 | B2 | | 11/2015 | Floyd | |
| 9,284,975 | B2 | | 3/2016 | Mitsch | |
| 9,470,092 | B2 | | 10/2016 | Kurapati et al. | |
| 10,563,541 | B2 | * | 2/2020 | Shirota | F16B 19/02 |
| 10,934,862 | B2 | * | 3/2021 | Whittle | F01D 5/284 |
| 2007/0031258 | A1 | * | 2/2007 | Campbell | F01D 9/04 416/189 |
| 2010/0166560 | A1 | * | 7/2010 | Blanchard | F01D 11/006 416/214 A |
| 2011/0027093 | A1 | * | 2/2011 | Delapierre | F01D 5/3092 416/220 R |
| 2013/0000322 | A1 | * | 1/2013 | Silkowski | F01D 7/00 415/68 |
| 2013/0243601 | A1 | * | 9/2013 | Floyd | F01D 5/3053 416/220 R |
| 2015/0040395 | A1 | * | 2/2015 | Delapierre | F01D 5/3007 29/889.1 |
| 2016/0108744 | A1 | * | 4/2016 | Locatelli | F01D 5/3007 416/214 A |
| 2017/0002659 | A1 | * | 1/2017 | Epstein | F02K 3/025 |
| 2017/0198592 | A1 | | 7/2017 | Colletti et al. | |
| 2018/0073397 | A1 | * | 3/2018 | Shirota | F16B 19/02 |
| 2019/0162077 | A1 | * | 5/2019 | Ghosh | F01D 25/164 |
| 2019/0211682 | A1 | * | 7/2019 | Meng | F01D 5/303 |
| 2020/0063577 | A1 | * | 2/2020 | Whittle | F01D 5/3092 |
| 2020/0123915 | A1 | | 4/2020 | Husband et al. | |

FOREIGN PATENT DOCUMENTS

| | | | | | |
|---|---|---|---|---|---|
| EP | 1319842 | A1 | * | 6/2003 | F01D 5/303 |
| EP | 2642076 | A2 | | 9/2013 | |
| EP | 2863017 | A1 | | 4/2015 | |
| FR | 2375440 | A1 | | 7/1978 | |
| GB | 2472572 | A | * | 2/2011 | F01D 25/164 |
| RU | 2527804 | C2 | * | 9/2014 | F01D 5/081 |

* cited by examiner

GAS TURBINE ENGINE INCLUDING A ROTATING BLADE ASSEMBLY

CROSS REFERENCE TO RELATED APPLICATIONS

This application claims priority to Italian Patent Application No. 102021000029963, filed Nov. 26, 2021, which is incorporated herein by reference in its entirety.

TECHNICAL FIELD

This disclosure generally relates to a gas turbine engine, and more specifically to a rotating blade assembly of the gas turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
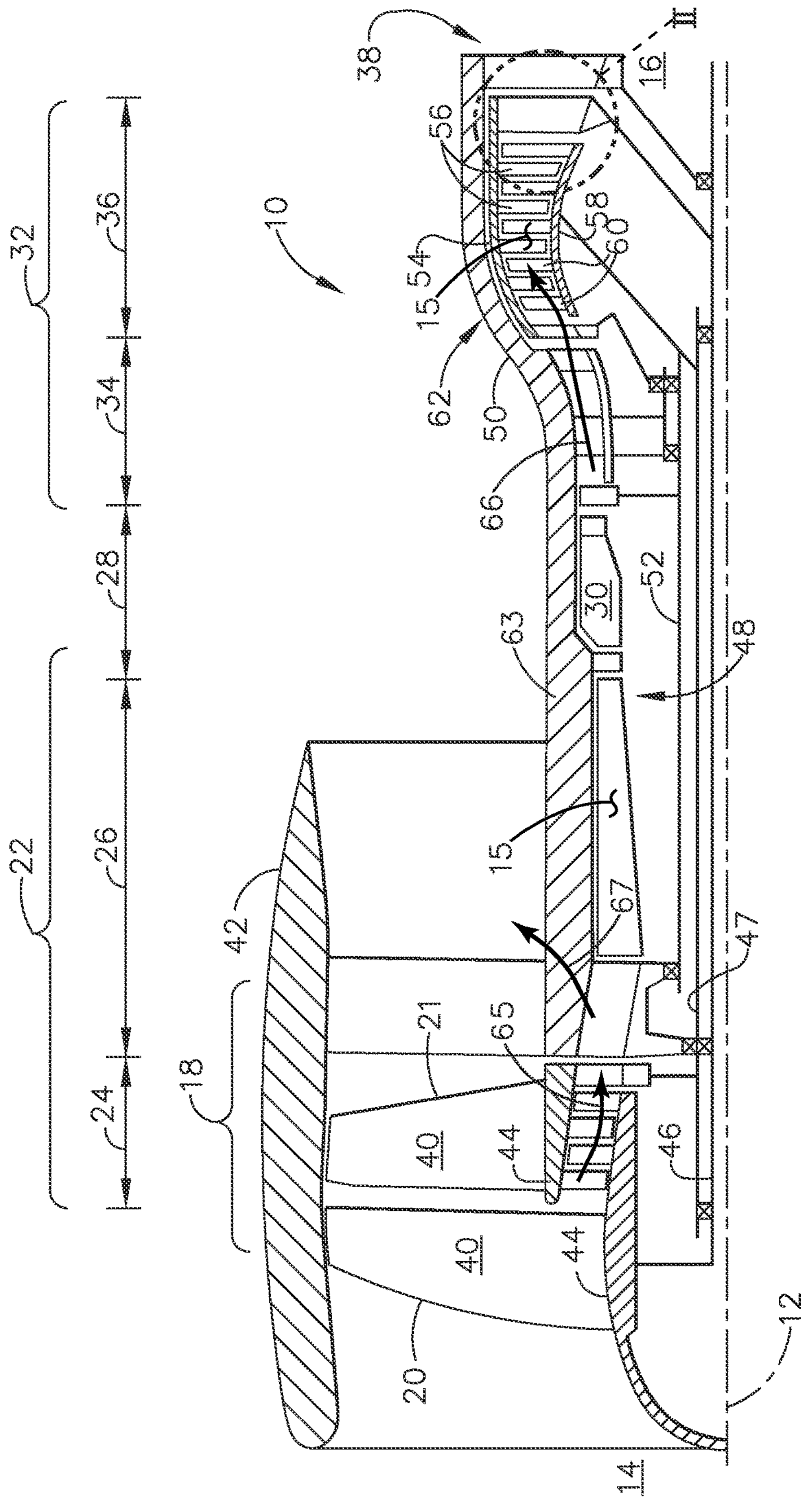
FIG. 1 is a schematic cross-sectional diagram of a turbine engine for an aircraft including a counter-rotating turbine section and counter-rotating compressor section in accordance with various aspects described herein.

Aspects of this disclosure relate to a rotating blade assembly for a gas turbine engine including a drive shaft. The rotating blade assembly further including a disc operably coupled to the drive shaft and including a seat having at least a portion of first through hole, and at least one blade assembly having a dovetail. A retainer assembly can secure the at least one blade assembly to the disc. Aspects of this disclosure are described in terms of a gas turbine engine, specifically a gas turbine engine including a counter-rotating section. In other words, a counter-rotating gas turbine engine. As used herein, the term “counter-rotating section”, or iterations thereof can refer to a portion of the gas turbine engine including a set of axially adjacent, serially arranged, rotating components (e.g., blades) which rotate in opposing circumferential directions. It will be understood, however, that although described in terms of the counter-rotating gas turbine engine that aspects of the disclosure described herein are not so limited and can have general applicability within any suitable gas turbine engine, a turboprop, turboshaft or a turbofan engine having a power gearbox, in non-limiting examples. It will be further understood, however, that aspects of the disclosure described herein are not so limited and can have general applicability within other gas turbine engines. For example, the disclosure can have applicability for a rotating blade assembly in other engines or vehicles, and can be used to provide benefits in industrial, commercial, and residential applications.

As used herein, the term “forward” or “upstream” refers to moving in a direction toward the gas turbine engine inlet, or a component being relatively closer to the gas turbine engine inlet as compared to another component. The term “aft” or “downstream” used in conjunction with “forward” or “upstream” refers to a direction toward the rear or outlet of the gas turbine engine or being relatively closer to the gas turbine engine outlet as compared to another component.

As used herein, “a set” can include any number of the respectively described elements, including only one element. Additionally, the terms “radial” or “radially” as used herein refer to a dimension extending between a center longitudinal axis of the gas turbine engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The gas turbine engine 10 has a generally longitudinally extending axis or centerline 12 extending from a forward direction 14 to an aft direction 16. The gas turbine engine 10 can include at least one counter-rotating portion. As such, the gas turbine engine 10 can be defined as a counter-rotating gas turbine engine. The gas turbine engine 10 includes, in downstream serial flow relationship, a fan section 18 including a forward fan assembly 20 and an aft fan assembly 21, a counter-rotating compressor section 22 including at least one counter-rotating section, a combustion section 28 including a combustor 30, a counter-rotating turbine section 32 including at least one counter-rotating section, and an exhaust section 38.

In the illustrated gas turbine engine 10, the counter-rotating compressor section 22 can include a counter-rotating low-Pressure (LP) compressor 24, and a counter-rotating high-Pressure (HP) compressor 26, while the counter-rotating turbine section 32 can include a counter-rotating HP turbine 34, and a counter-rotating LP turbine 36. It will be understood that aspects of the disclosure can have applicability toward other turbines engines, including engines without any counter-rotating sections, or turbine engines including a portion that is non counter-rotating. As a non-limiting example, aspects of the disclosure can have applicability toward other gas turbine engines not including a counter-rotating LP turbine. For example, turbine engines having LP turbines in which static circumferentially-arranged vanes are axially spaced from rotating circumferentially-arranged blades are also contemplated.

The fan assemblies 20 and 21 are positioned at a forward end of the gas turbine engine 10 as illustrated. The terms "forward fan" and "aft fan" are used herein to indicate that one of the fan assemblies 20 is coupled axially upstream from the aft fan assembly 21. It is also contemplated that the fan assemblies 20, 21 can be positioned at an aft end of gas turbine engine 10. Fan assemblies 20 and 21 each include a plurality of rows of fan blades 40 positioned within a fan casing 42. Fan blades 40 are joined to respective rotor discs 44 that are rotatably coupled through a respective forward fan shaft 46 to the forward fan assembly 20 and through an aft fan shaft 47 to the aft fan assembly 21.

The counter-rotating HP compressor 26, the combustor 30, and the counter-rotating HP turbine 34 form an engine core 48 of the gas turbine engine 10. The gas turbine engine core 48 is surrounded by an outer casing 50 that can be coupled with the fan casing 42. The counter-rotating HP turbine 34 is coupled to the counter-rotating HP compressor 26 via a core rotor or shaft 52. In operation, the gas turbine engine core 48 generates combustion gases that are channeled downstream to the counter-rotating LP turbine 36 which extracts energy from the gases for powering fan assemblies 20, 21 through their respective fan shafts 46, 47.

The counter-rotating LP turbine 36 includes an outer rotor 54 positioned radially inward from the outer casing 50. The outer rotor 54 can have a generally frusto-conical shape and include a first set of airfoils 56, circumferentially arranged, that extend radially inwardly towards the engine centerline 12.

The counter-rotating LP turbine 36 further includes an inner rotor 58 arranged substantially coaxially with respect to, and radially inward of, the outer rotor 54. The inner rotor 58 includes a second set of airfoils 60 circumferentially arranged and axially spaced from the first set of airfoils 56. The inner rotor 58 can further be defined as a first rotor, while the outer rotor 54 can be defined as a second rotor. The second set of airfoils 60 extend radially outwardly away from the engine centerline 12. The first and second sets of airfoils 56, 60 together define a plurality of turbine stages 62. In the example of FIG. 1, five turbine stages 62 are shown, and it will be understood that any number of stages can be utilized. Furthermore, while the first set of airfoils 56 are illustrated as being forward of the second set of airfoils 60, the first and second sets of airfoils 56, 60 can be arranged in any suitable manner, including the first set of airfoils 56 being positioned aft of the second set of airfoils 60.

While the gas turbine engine 10 is described in the context of including a rotating outer rotor 54 and rotating inner rotor 58, it is further contemplated that either of the first set of airfoils 56 or the second set of airfoils 60 can be included in, or form part of, a fixed stator within the gas turbine engine 10. In one example, the first set of airfoils 56 can form a set of circumferentially-arranged static vanes forming part of an outer stator within the gas turbine engine 10, while the second set of airfoils 60 is coupled to the rotatable inner rotor 58. In another example, the second set of airfoils 60 can be in the form of static vanes coupled to an inner stator within the gas turbine engine 10, with the first set of airfoils 56 being in the form of blades coupled to an outer rotor.

Complementary to the outer rotor 54 and inner rotor 58, the stationary portions of the gas turbine engine 10, such as the outer casing 50, are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled along a main flow path 15 into the counter-rotating LP compressor 24, which then supplies pressurized air 65 to the counter-rotating HP compressor 26, which further pressurizes the air. The pressurized air 65 from the counter-rotating HP compressor 26 is mixed with fuel in the combustor 30 and ignited, thereby generating combustion gases 66 along the main flow path 15. Some work is extracted from these combustion gases 66 by the counter-rotating HP turbine 34, which drives the counter-rotating HP compressor 26. The combustion gases 66 are discharged along the main flow path 15 into the counter-rotating LP turbine 36, which extracts additional work to drive the counter-rotating LP compressor 24, and the exhaust gas is ultimately discharged from the gas turbine engine 10 via the exhaust section 38. The driving of the counter-rotating LP turbine 36 can drive rotation of the forward fan assembly 20 and the counter-rotating LP compressor 24.

A portion of the pressurized air 65 can be drawn from the counter-rotating compressor section 22 as bleed air 67. The bleed air 67 can be drawn from the pressurized air 65 and provided to engine components requiring cooling. The temperature of pressurized air 65 entering the combustor 30 is significantly increased above the bleed air 67 temperature. The bleed air 67 may be used to reduce the temperature of the core components downstream of the combustor.

Some of the air supplied by the fan 20, such as the bleed air 67, can bypass the gas turbine engine core 48 and be used for cooling of portions, especially hot portions, of the gas turbine engine 10, or for cooling or powering other portions of the gas turbine engine 10. In the context of a turbine engine, the hot portions of the gas turbine engine are normally downstream of the combustor 30, especially the counter-rotating turbine section 32, with the counter-rotating HP turbine 34 being the hottest portion as it is directly downstream of the combustion section 28. Other sources of cooling fluid can be, but are not limited to, fluid discharged from the counter-rotating LP compressor 24 or the counter-rotating HP compressor 26.

Figure 2:
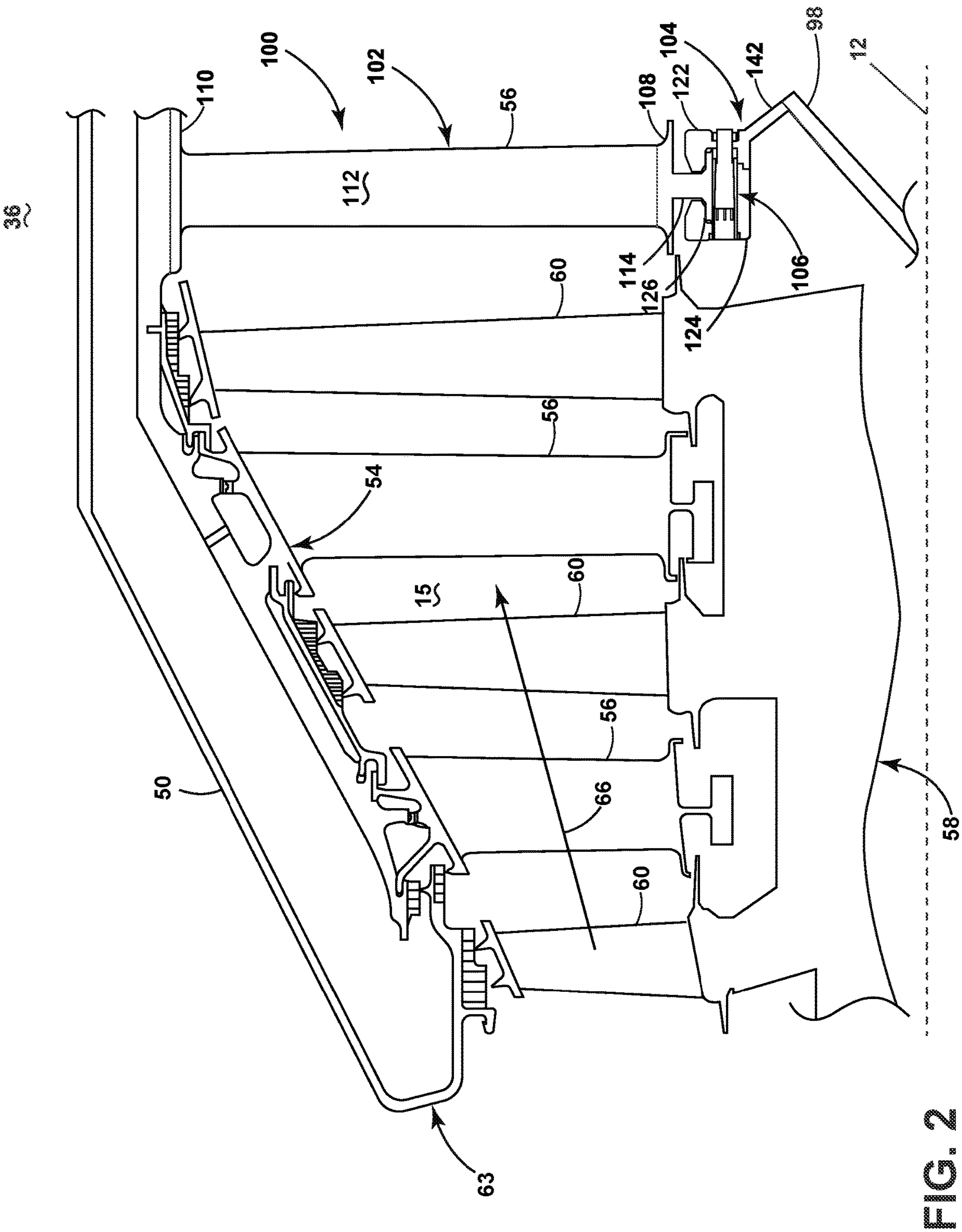
FIG. 2 is a cross-sectional view of the counter-rotating turbine section of the turbine engine of FIG. 1 as seen from cut II of FIG. 1, further illustrating a rotating blade assembly including a disc, a blade assembly, and a retainer assembly.

FIG. 2 is a cross-sectional axial view of the gas turbine engine 10 of FIG. 1 as seen from cut II of FIG. 1. The gas turbine engine 10 can include a rotating blade assembly 100 within a portion of the gas turbine engine 10. The rotating blade assembly 100 is configured to rotate about a rotational axis, illustrated as the axis 12. The rotating blade assembly 100 can be provided within a portion of the counter-rotating LP turbine 36. It will be appreciated, however, that the rotating blade assembly 100 can be provided within any suitable portion of the gas turbine engine 10 such as within any suitable portion of the counter-rotating compressor section 22 or the counter-rotating turbine section 32. Further, although a single rotating blade assembly 100 is illustrated, it will be appreciated that there can be any number of one or more rotating blade assemblies 100 provided within the gas turbine engine 10.

The rotating blade assembly 100 can include a blade assembly 102, a disc 104, and a set of retainer assemblies 106. At least a portion of the disc 104 can be operably coupled to a rotating component of the gas turbine engine 10. As a non-limiting example, the disc 104 can be operably coupled to a drive shaft 98 of the gas turbine engine 10. At least a portion of the blade assembly 102 can be operably coupled to another rotating component. As a non-limiting example, the blade assembly can be coupled to the inner rotor 58 or the outer rotor 54.

The blade assembly 102 can include an inner platform 108, an outer platform 110, located radially outward form the inner platform 108 with respect to the engine centerline 12, and a set of circumferentially spaced blades 112 extending therebetween. As illustrated, the set of circumferentially spaced blades 112 can include the first set of airfoils 56. It will be appreciated, however, that the set of circumferentially spaced blades 112 can include any suitable set of airfoils such as, but not limited to, the second set of airfoils 60. The set of circumferentially spaced blades 112 can be any suitable blade or vane within the gas turbine engine 10 that is operably coupled to the outer rotor 54, the inner rotor 58, or a static portion of the gas turbine engine 10 (e.g., the stator 63). The outer platform 110 can be operably coupled to a rotating element of the gas turbine engine 10. As a non-limiting example, the outer platform 110 can be operably coupled to the inner rotor 58 or the outer rotor 54 of the gas turbine engine 10. A dovetail 114 can extend from a radially inner portion of the inner platform 108.

The disc 104 can extend between outer peripheries in the axial and radial directions. The disc 104 can further encase or confront at least a portion of the blade assembly 102. As a non-limiting example, the disc 104 can encase a radially inner portion of the blade assembly 102. As a non-limiting example, the disc 104 can encase a portion of the dovetail 114. The disc 104 can further include inner peripheries. At least a portion of the inner peripheries can confront or contact the blade assembly 102 or the retainer assembly 106. At least a portion of the inner peripheries can define a seat 126 at least partially encasing or confronting the dovetail 114. The seat 126 can further be defined by a first band 122 and a second band 124. As illustrated, the second band 124 can be provided axially forward or otherwise upstream, with respect to the combustion gasses 66, of the first band 122. The disc 104 can be sized and/or shaped such that the disc 104 can fit over, or otherwise encase, at least a corresponding portion of the dovetail 114.

The disc 104 can further include a projection 142 extending from a portion of the remainder of the disc 104. As illustrated, the projection 142 can extend from a portion of the first band 122. The projection 142 can be operatively coupled to the drive shaft 98 of the gas turbine engine 10. The drive shaft 98 can be any suitable drive shaft 98 as described herein such as, but not limited to, the forward fan shaft 46, the aft fan shaft 47, or the core shaft 52. As such, in the case where the rotating blade assembly 100 is provided within the counter-rotating turbine section 32, the rotation of the rotating blade assembly 100 can be used to rotationally drive the drive shaft 98, which in turn can drive an upstream portion of the gas turbine engine 10 (e.g., a rotating component of the counter-rotating compressor section 22, a portion of the fan section 18, etc.). Although the projection 142 is illustrated, it will be appreciated that the disc 104 can be formed without the projection 142. As such, in some implementations the disc 104 is only coupled to the rotating blade assembly 100 and not the drive shaft.

The retainer assembly 106 can extend through a portion of the disc 104 and operably couple the disc 104 to the blade assembly 102. As illustrated, the retainer assembly 106 can extend axially through the disc 104 and confront axially opposing ends of the disc 104. As such, the retainer assembly 106 can axially retain the disc 104 around a portion of the blade assembly 102. As a non-limiting example, the retainer assembly 106 can axially retain the disc 104 about the dovetail 114 of the blade assembly 102.

The blade assembly 102 can be included within a set of circumferentially spaced blade assemblies 102. The set of blade assemblies 102 can extend about the entirety of the engine centerline 12 to form a ring of blade assemblies 102. At least a portion of the disc 104, however, can continuously extend across an entirety of the engine centerline 12. In other words, the disc 104 can form a 360 degree ring about the engine centerline 12. As such, the disc 104 can extend across one or more blade assemblies 102 in the set of blade assemblies 102. Similarly, the projection 142 can be formed as a continuous ring or band that extends about the entirety of the engine centerline 12. Alternatively, the projection 142 can be formed in discrete sections such that the projection 142 is included within a set of segmented projections 142 that extend from respective portions of the disc 104. As such, the disc 104 can be formed as a hub and spoke assembly when viewed in a plane normal to the engine centerline 12 and intersecting the disc 104. The set of retainer assemblies 106 can include any suitable number of retainer assemblies 106 circumferentially spaced along the disc 104. As a non-limiting example, the set of retainer assemblies 106 can be regularly or otherwise equally circumferentially spaced about the disc 104. Alternatively, the two or more retainer assemblies 106 may be formed in groups in which the retainer assemblies 106 are closer to one another than they are to an adjacent group of retainer assemblies 106. In any case, the disc 104 can be axially retained to each dovetail 114 of each blade assembly 102 of the set of blade assemblies 102 via the set of retainer assemblies 106.

As illustrated, the blade assembly 102, the disc 104 and the retainer assembly 106 are discrete components that are operably coupled to, or otherwise confront one another. It will be appreciated, however, that at least a portion of the blade assembly 102, the disc 104, or the retainer assembly 106 can be integrally formed with another portion of the rotating blade assembly 100. As a non-limiting example, the retainer assembly 106 can be integrally formed with the second band 124 or the first band 122 of the disc 104. As another non-limiting example, at least one of the first band 122 or the second band 124 can be integrally formed with the blade assembly 102 such that the blade assembly 102 and the disc 104 form a monolithic structure.

Figure 3:
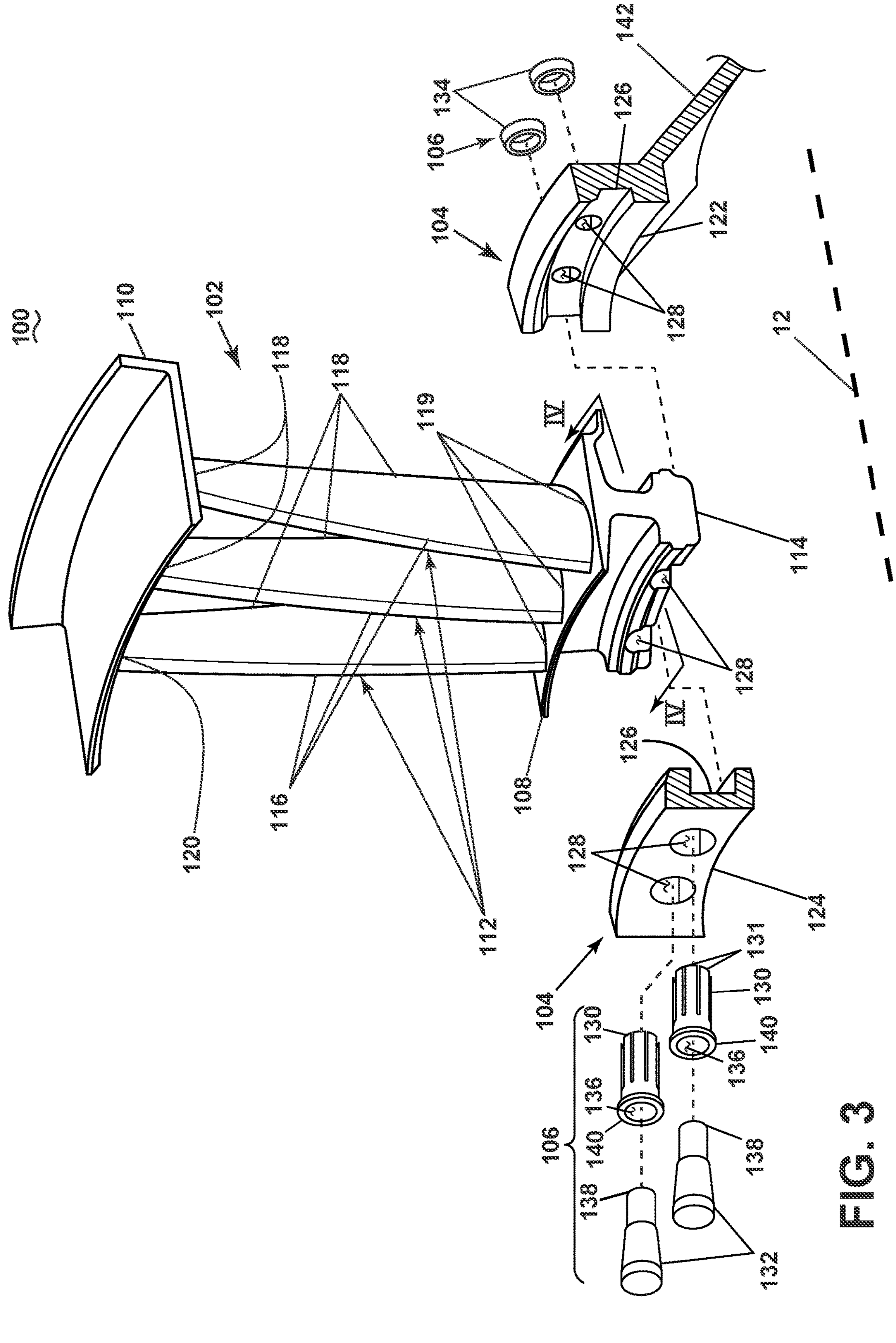
FIG. 3 is an exploded perspective view of the rotating blade assembly of FIG. 2, further illustrating the disc, the blade assembly, and the retainer assembly.

FIG. 3 is an exploded perspective view of the rotating blade assembly 100 of FIG. 2. The rotating blade assembly 100 can include the blade assembly 102, the disc 104, and the retainer assembly 106.

Each blade 112 of the set of circumferentially spaced blades 112 can include an outer wall demarcated by a leading edge 116 and a trailing edge 118, downstream or otherwise axially aft the leading edge 116, a root 119, and a tip 120. The extension of the outer wall between the leading edge 116 and the trailing edge 118 can define a chord-wise direction. The extension of the outer wall between the root 119 and the tip 120 can define a span-wise direction. The root 119 can be coupled to, or otherwise integral with, the inner platform 108. The tip 120 can be coupled to, or otherwise integral with the outer platform 110.

A first through hole 128 can be defined by a portion of the disc 104. As a non-limiting example, the first band 122 and the second band 124 can each include a portion of the first through hole 128. A radially inner portion, or a distal end of the dovetail 114 can further include a portion of the first through hole 128. When assembled, the first through hole 128 can extend continuously through the first band 122, the dovetail 114, and the second band 124. The first through hole 128 can extend from an upstream to a downstream portion of the rotating blade assembly 100 in the axial direction.

Each retainer assembly 106 of the set of retainer assemblies 106 can include a tubular element, a pin 132, and a fastener 134. The tubular element can include any suitable tubular shape when viewed in a plane normal to the engine centerline 12 and intersecting the tubular element such as, but not limited to, a square tube, a cylindrical tube, or any other suitable tube. At least a portion of the retainer assembly 106 can confront, contact, or be coupled to the seat 126 of the disc 104.

As a non-limiting example, the tubular element can be any suitable tubular element such as a bushing 130. The bushing 130 can include a set of fingers 131 extending along a portion of the bushing 130. Each finger 131 of the set of fingers 131 can be separated from an adjacent finger 131 by a void or absence of material. The bushing 130 can include a hollow interior defining a second through hole 136. As such, the tubular element can further be defined as a hollow tubular element. The pin 132 can be aligned with and at least partially received within the first through hole 128 and the second through hole 136. The pin 132 can terminate at a distal end 138. When assembled, the distal end 138 can extend past the first through hole 128. The bushing 130 can be aligned with the first through hole 128. The bushing 130 can further include a first end defining a shoulder 140, which, when assembled, can abut at least a portion of the disc 104. As a non-limiting example, the shoulder 140 can abut the second band 124. The fastener 134 can be secured to the distal end 138 of the pin 132 and abut a portion of the disc 104. The tubular element can be generally defined as any suitable element that is expandable through mechanical features (e.g., the fingers 131) when an external force is applied to an interior of the tubular element. It is further contemplated that the tubular element can be expandable through material properties (e.g., heat properties, elasticity, etc.). As a non-limiting example, the tubular element can be a rubber tube that expands when the external force is applied by the pin 132.

Figure 4:
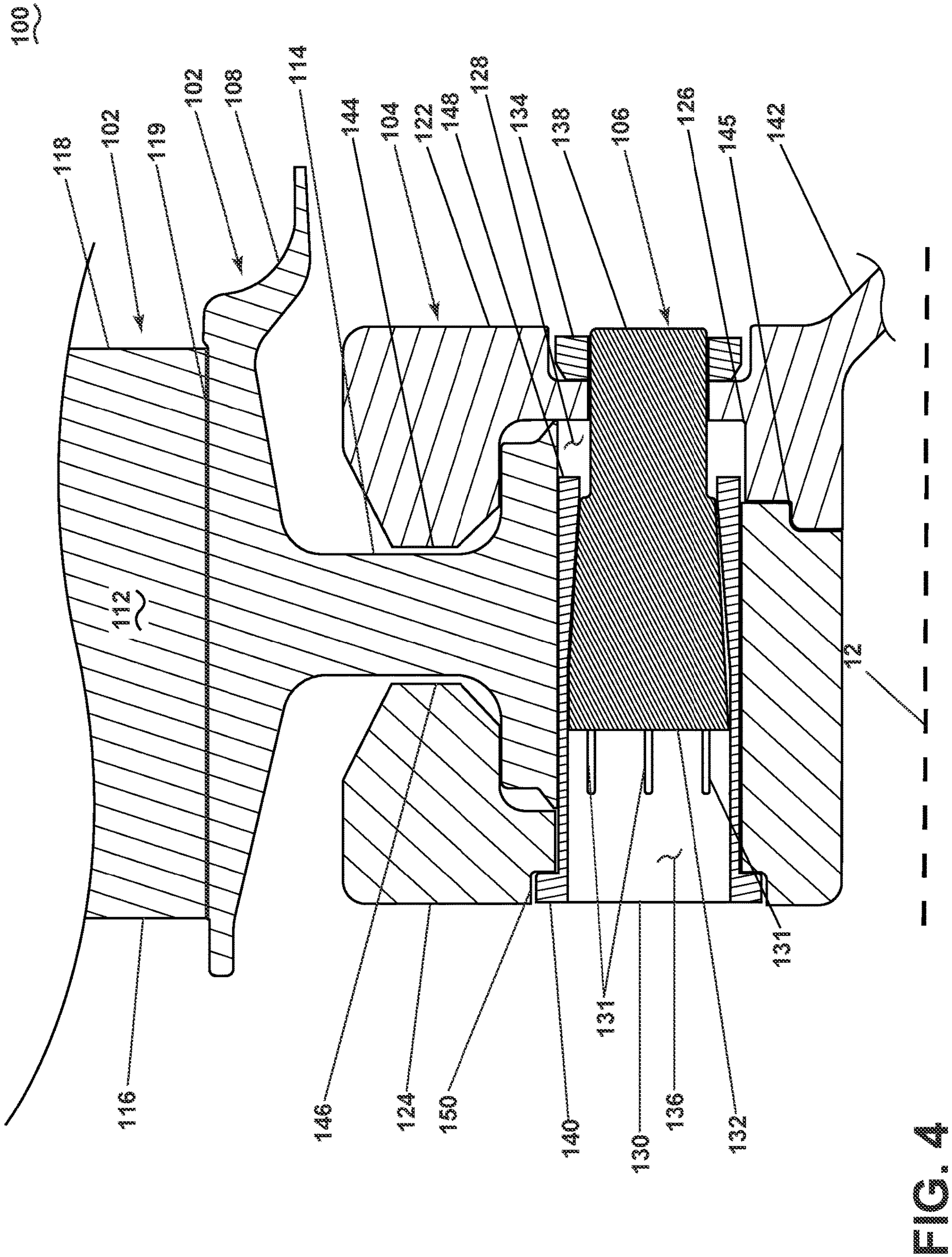
FIG. 4 is a cross-sectional view of the rotating blade assembly as seen from cut IV-IV of FIG. 3, further illustrating the retainer assembly.

FIG. 4 is a cross-sectional view of the rotating blade assembly 100 as seen from cut IV-IV of FIG. 3.

The first band 122 can include a first rib 144. The second band 124 can include a second rib 146, opposing the first rib 144. As illustrated, the first rib 144 and the second rib 146 can be provided on axially opposite sides of the dovetail 114. The first rib 144 and the second rib 146 can both interface, or otherwise contact a corresponding portion of the dovetail 114. The first rib 144 and the second rib 146 can be used to radially retain the disc 104 on the blade assembly 102.

The second band 124 can include a portion which overlaps a corresponding portion of the first band 122. This overlapping portion can define a lap joint 145 formed between the first band 122 and the second band 124. The lap joint 145 can define a coupling or an interface between the first band 122 and the second band 124. It is contemplated that the lap joint 145 can further be used to align the first band 122 with respect to the second band 124.

The second band 124 can include a portion which overlaps a corresponding portion of the first band 122. This overlapping portion can define the lap joint 145 formed between the first band 122 and the second band 124. The lap joint 145 can define a coupling or an interface between the first band 122 and the second band 124. It is contemplated that the lap joint 145 can further be used to align the first band 122 with respect to the second band 124.

As illustrated, the bushing 130 of the retainer assembly can extend through a portion of the first through hole 128 such that the second through hole 136 is aligned with the first through hole 128. It is contemplated that the bushing 130 can end along a distal end 148 of the bushing 130. The distal end 148 of the bushing 130 can be provided within a portion of the first through hole 128. As a non-limiting example, the distal end 148 can be spaced from the first band 122 such that the bushing 130 does not physically contact the first band 122.

It is further contemplated that the first through hole 128 and the second through hole 136 can each include a non-constant cross-sectional area when viewed in a plane normal to the engine centerline 12 and intersecting the disc 104. As a non-limiting example, the first through hole 128 can include an area with a reduced cross-sectional area within a portion of the first band 122 when compared to the remainder of the first through hole 128. The portion of the first through hole 128 with the reduced cross-sectional area can directly contact at least a portion of the pin 132. As a non-limiting example, the bushing 130 can include a portion with a decreasing cross-sectional area. In other words, the bushing 130 can include a portion in which the cross-sectional area decreases linearly or non-linearly. As a non-limiting example, at least a portion the cross-sectional area of the bushing 130 can decrease from an upstream or axially forward portion to a downstream or axially aft portion. Similarly, the pin 132 can include a decreasing cross-sectional area when viewed in a plane normal to the engine centerline 12 and intersecting the pin 132. As such, the pin 132 can be defined as a conical pin and the bushing can be defined as a conical bushing. The decreasing cross-sectional area of the pin 132 can correspond to the decreasing cross-sectional area of the bushing 130 such that the pin 132 can interface with the bushing 130 along the sections of the bushing 130 and the pin 132 defined by the decreasing cross-sectional areas. The interface between the bushing 130 and the pin 132 can be used to retain the pin 132 within the bushing 130.

The shoulder 140 of the bushing 130 can interface with the disc 104. As a non-limiting example, the shoulder 140 of the bushing 130 can interface with the second band 124. The second band 124 can include a cutout 150 sized to receive the shoulder 140 of the bushing 130. As such, a forward portion of bushing 130 can be flush with a forward portion of the second band 124.

It is contemplated that at least a portion of the fastener 134 can abut a portion of the first band 122. The fastener 134 can be any suitable fastener 134 such as, but not limited to, a nut, a hydraulic fastener, a magnetic fastener, a weld, an adhesive, or an electrical connection (e.g., an electro-actuated connection). As a non-limiting example, the fastener 134 can be defined by a nut. As such, the distal end 138 can further include a threaded portion corresponding to a threaded portion of the nut. As such, the nut can be fastened, or otherwise threaded onto the threaded portion of the pin 132.

During assembly, the disc 104 can be fit over a corresponding portion of the dovetail 114 such that the first through hole 128 is continuously formed through the first band 122, the second band 124 and the dovetail 114. The first rib 144 and the second rib 146 can each interface with a corresponding portion of the dovetail 114. The lap joint 145 can be sized and positioned to ensure that the first rib 144 and the second rib 146 are positioned within the correct position when assembled. Further, the lap joint 145 can be sized to ensure that the first through hole 128 is continuously formed through the disc 104 and the dovetail 114 once the disc 104 is positioned over the dovetail 114. The bushing 130 can subsequently be aligned with the first through hole 128 and inserted therein. The bushing 130 can be inserted such that the shoulder 140 contacts or is received within the cutout 150. The pin 132 can then be inserted into the second through hole 136 defined by the bushing 130. As discussed herein, the distal end 138 of the pin 132 can extend past a termination of the first through hole 128. The fastener 134 can then be placed, applied, fastened, or otherwise coupled to the distal end 138 of the pin 132 and abut a portion of the disc 104 (e.g., the first band 122). The fastener 134 can apply an axial tightening or a closing force on the pin 132 to draw the pin 132 toward the fastener 134, which is axially constrained by the disc 104. As the pin 132 is drawn toward the fastener 134, the pin 132 is first axially moved until it is in contact with the bushing 130, where continued axial movement of the pin 132 next causes the shoulder 140 to abut the cutout 150 formed within the disc 104. Through the shoulder 140 abutting the cutout 150, and the fastener 134 abutting the disc 104, opposing closing forces are exerted on opposing axial ends of the disc 104, which, in turn, axially retains the disc 104 over the dovetail 114. Any additional axial movement of the pin 132 causes the fingers 131 of the bushing 130 to radially expand and apply an expansive hoop force between the disc 104 and the dovetail 114. As such, the bushing 130 can further be defined as an expandable bushing or an expandable tubular element, respectively, with it being understood that the expansion of the bushing 130 can be generated via any suitable method such as a mechanical component, or a material property of the bushing 130. Similarly, the pin 132 can be generally defined as a component configured to actuate and expand the bushing 130 as described herein. The expansive hoop force, in turn, urges the dovetail 114 against the first rib 144 and the second rib 146. Thus, with this type of connection, the retainer assembly 106 both axially constrains the disc 104 to the dovetail 114 as well as radially constrains the disc 104 to the dovetail 114.

During operation of the gas turbine engine 10, a working airflow can flow over a portion of the rotating blade assembly 100. As a non-limiting example, the working airflow can flow over the set of circumferentially spaced blades 112 of the rotating blade assembly 100. As a non-limiting example, the working airflow can be any suitable airflow within the gas turbine engine such as, but not limited to, the pressurized air 65 or the combustion gases 66. In the case where the rotating blade assembly 100 is provided within the counter-rotating turbine section 32, the rotating blade assembly 100 can extract work from the working airflow as it flows over the rotating blade assembly 100. In the case where the rotating blade assembly 100 is provided within the counter-rotating compressor section 22, the rotating blade assembly 100 can pressurize or otherwise compress the working airflow.

As discussed herein, the rotating blade assembly 100 can include a set of circumferentially spaced blade assemblies 102 that are discrete from another. It is contemplated that the disc 104 can be used to couple each blade assembly 102 of the set of blade assemblies 102 such that a continuous ring of blade assemblies 102 is formed. As such, the rotating blade assembly 100 can be formed as a rigid rotating blade assembly 100 by interconnecting the blade assemblies 102 through use of the disc 104. This, in turn, can ensure that there are no or otherwise minimal radial clearance between the outer rotor 54 and the outer band 110, and a portion of the disc 104 (e.g., the projection 142) and the drive shaft 98. The reduction or elimination of the clearances can ensure that the rotation of the set of blades 102 within the rotating blade assembly 100 is concentric with the rotation of the outer platform 110 or the outer rotor 54. Similarly, the reduction or the elimination of the clearances can ensure that the disc 104 is concentric with the outer band 110. With the concentric rotation and assembly of the rotating blade assembly 100, the total amount of losses are reduced (e.g., frictional losses through adjacent pieces abutting one another. This ultimately ensures that the overall efficiency of the gas turbine engine 10 is increased when compared to the gas turbine engine 10 if it did not include the rotating blade assembly 100 with the disc 104.

During normal operation of the gas turbine engine 10, an operational force can be exerted on the rotating blade assembly 100. The operational force can be defined as any suitable force exerted on the rotating blade assembly 100 during normal operation of the gas turbine engine 10 (e.g., a rotational force or a thermal load). As a non-limiting example, an operational force of 30k lb can be exerted on the rotating blade assembly 100. The operational force can be exerted onto the disc 104 and define a radially inward force with respect to the engine centerline 12. It is contemplated that the disc 104 can be formed to withstand these operational forces of the gas turbine engine 10. As a non-limiting example, the interface of the disc 104 with the dovetail 114 (e.g., the first rib 144 and the second rib 146) can be sized or formed to withstand these operational forces. During shutdown of the gas turbine engine 10, however, a shutdown force, opposite the operational force, is exerted on the rotating blade assembly 100. In other words, during shut down of the gas turbine engine 10, a radially outward force can be exerted on the rotating blade assembly 100. The shutdown force can be smaller than the operational forces. As a non-limiting example, the shutdown force can be $1/20^{th}$ of the operational force. As a non-limiting example, if the operational force is 30k lb, the shutdown force can be 1.5k lb. Unlike the operational force, however, the shutdown force is transferred through a portion of the retainer assembly 106 as opposed to only the disc 104. As such, the retainer assembly 106 is sized and formed to withstand the shutdown force. As the shutdown force is much smaller than the operational force, the retainer assembly 106 can be formed with a weaker material than the disc 104, which ultimately reduces the material costs associated with the rotating blade assembly 100.

Figure 5:
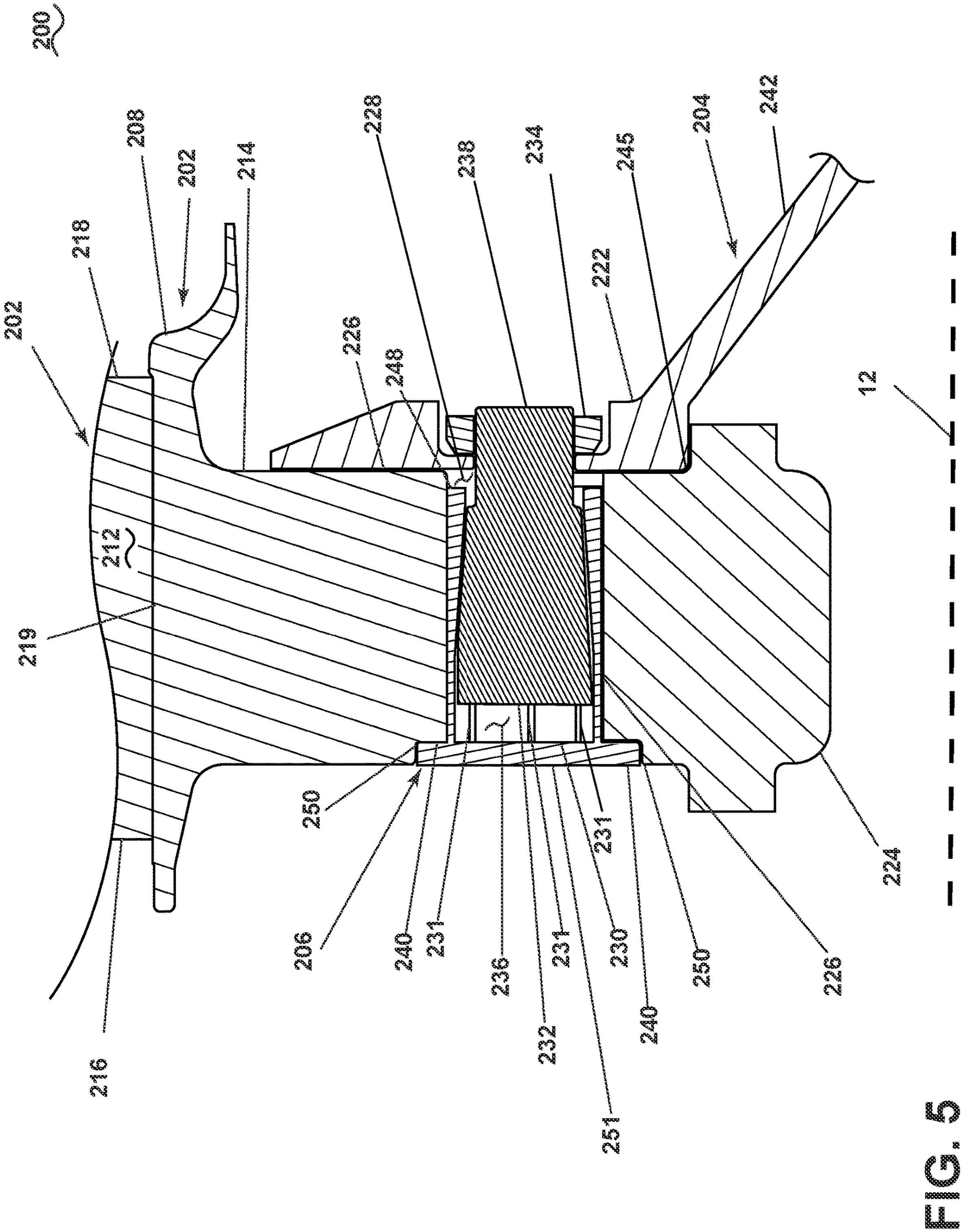
FIG. 5 is a cross-sectional view of an exemplary rotating blade assembly of the gas turbine engine of FIG. 1, further illustrating an exemplary disc and exemplary blade assembly.

FIG. 5 is a cross-sectional view of an exemplary rotating blade assembly 200 for use within the gas turbine engine of FIG. 1. The exemplary rotating blade assembly 200 is similar to the rotating blade assembly 100; therefore, like parts will be identified with like numerals in the 200 series, with it being understood that the description of the like parts of the rotating blade assembly 100 applies to the exemplary rotating blade assembly 200 unless otherwise noted.

The rotating blade assembly 200 can include a blade assembly 202, a disc 204, and a retainer assembly 206 similar to the rotating blade assembly 100. The blade assembly 202, similar to the blade assembly 102, can include a blade 212 extending from a root 219 to a tip (not illustrated), and a leading edge 216 to a trailing edge 218. The root 219 can be coupled to an inner platform 208 of the blade assembly 202, while the tip can be coupled to an outer platform (not illustrated) of the blade assembly 202. A dovetail 214 can depend from the inner platform 208. The disc 204, similar to the disc 104, can include a first band 222 and a second band 224 that together form a seat 226. The first band 222 can optionally be operably coupled to a drive shaft through a projection 242. The retainer assembly 206, similar to the retainer assembly 106, can include a bushing 230, a pin 232 and a fastener 234. The bushing 230 can include a shoulder 240 and a set of fingers 231, which interfaces with a cutout 250 formed within a portion of the second band 224. The pin 232 can be defined by a distal end 238, and the fastener 234 can be secured to the distal end 238. At least a portion of the disc 204 and the dovetail 214 can form a continuous first through hole 228. An interior of the bushing 230 can define a second through hole 236 aligned with the first through hole 228. The pin 232 can be provided at least partially within the second through hole 236 and the first through hole 228. A lap joint 245 can be formed between the first band 222 and the second band 224 and define an interface or coupling between the first band 222 and the second band 224.

The disc 204 is similar to the disc 104 as it includes the first band 222 and the second band 224. The first band 222, however, forms a plate abutting a portion of the dovetail 214 and the second band 224. The second band 224, however, can be formed to only extend across a radially inner portion of the rotating blade assembly 200. In other words, the second band 224 does not extend forward of, or otherwise confront a portion of the dovetail 214 along a portion of the rotating blade assembly 200 including the retainer assembly 206. Further, the only portion of the first through hole 228 defined by the second band 224 is the portion of the second band 224 opposing the dovetail 214. In other words, the second band 224 does not define a full portion of the first through hole 228 on its own as the second band 124 does (e.g., the hole formed within an axially forward portion of the second band 124). The bushing 230 can extend through a portion of the first through hole 228 and terminate within the first through hole 228 at a termination 248.

The cutout 250 is similar to the cutout 150, however, the cutout 250 is also at least partially formed within the dovetail 214. As such, the shoulder 240 of the bushing 230 can abut at least a portion of the disc 204 and the dovetail 214 or blade assembly 202. As illustrated, the first through hole 228 has a smaller axial length than the first through hole 128. This is due to configuration of the disc 204.

The bushing 230 is similar to the bushing 130, except the bushing 230 can have a smaller axial length when compared to the bushing 130. This is due to the smaller axial length of the first through hole 228. This, in turn, reduces the material required for the manufacturing of the retainer assembly 206. Further, the bushing 230 can include a wall 251, which terminates at radially distal ends to define the shoulder 240.

During operation of the gas turbine engine 10, at least a portion of the working airflow can flow toward the disc 204, thus defining a leakage fluid. It is contemplated that minimizing the leakage fluid within the gas turbine engine 10 can maximize the amount of working airflow that flows over the blades 212, which in turn maximizes the amount of work extracted from the working airflow. With the wall 251 and the shoulder 240, the bushing 230 can form a fluid tight seal between the disc 204 and the blade assembly 202. This, in turn, ensures that a leakage fluid does not enter either of the first through hole 228 or the second through hole 236. This reduces the total amount of leakage fluid, which in turn maximizes the overall efficiency of the rotating blade assembly 200. It is contemplated that the remainder of the disc 204 can be used to limit the leakage fluid. As a non-limiting example, the first band 222 can be used to reduce or otherwise eliminate the leakage fluid, which can flow from an upstream portion of the rotating blade assembly 200 to a downstream portion of the rotating blade assembly 200.

Figure 6:
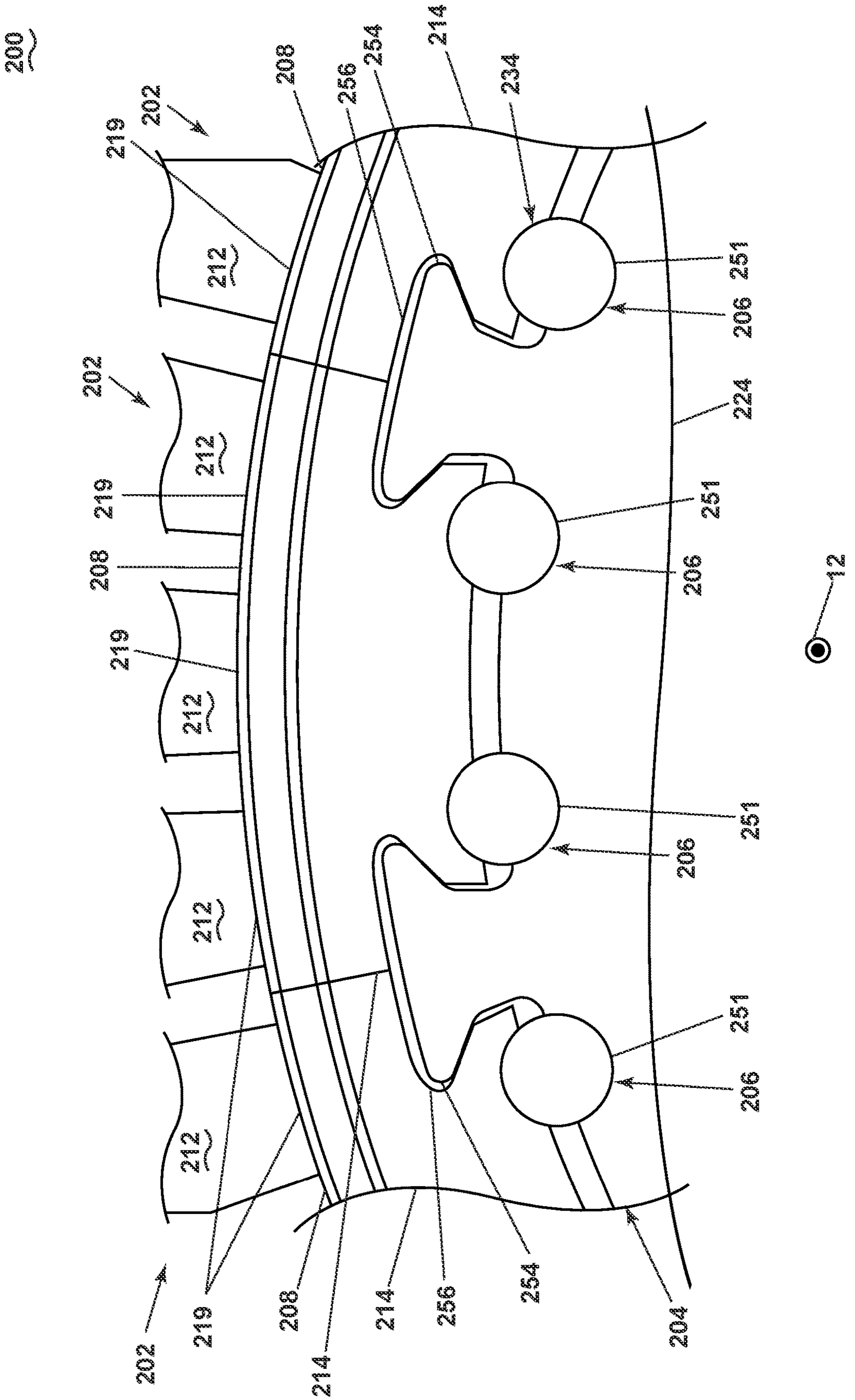
FIG. 6 is a radial view of the rotating blade assembly of FIG. 5, further illustrating a tail of the exemplary disc received within the exemplary blade assembly.

FIG. 6 is a radial view of the rotating blade assembly 200 of FIG. 5 as seen from a plane normal to the engine centerline 12 and intersecting the rotating blade assembly 200. The rotating blade assembly 200 can include the blade assembly 202, which is included within a set of blade assemblies 202 circumferentially spaced with respect to one another.

The disc 204 can be coupled to the dovetail 214 through a dovetail connection defined by a tail 254 and a socket 256. The disc 204 can include the tail 254, which extends radially, with respect to the engine centerline 12, from a remainder of the disc 204. As a non-limiting example, the second band 224 can include the tail 254, which extends radially from the reminder of the second band 224.

The socket 256 can be formed between circumferentially adjacent portions of adjacent blade assemblies 202. As illustrated, the socket 256 can be formed by circumferentially adjacent cutouts formed within a portion of adjacent dovetails 214. The socket 256 can be sized and shaped to receive the tail 254 of the disc 204.

During assembly of the rotatable blade assembly 200, the tail 254 of the disc 204 can be inserted through or into the socket 256. This can be done by sliding the tail 254, and hence the disc 204, into the socket 256. At least a portion of the tail 254 can interface with the socket 256. The interface between the tail 254 and the socket 256 can radially retain the disc 204 to the blade assembly 202. This radial retention through the tail 254 and the socket 256 is similar to the radial retention between the first rib 144 and the second rib 146, and the dovetail 114 of the rotatable blade assembly 100. Further, as the bushing 230 directly contacts the dovetail 214, at least a portion of the closing force that axially retains the disc 204 on the blade assembly 202 can be applied directly to the blade assembly 202.

Figure 7:
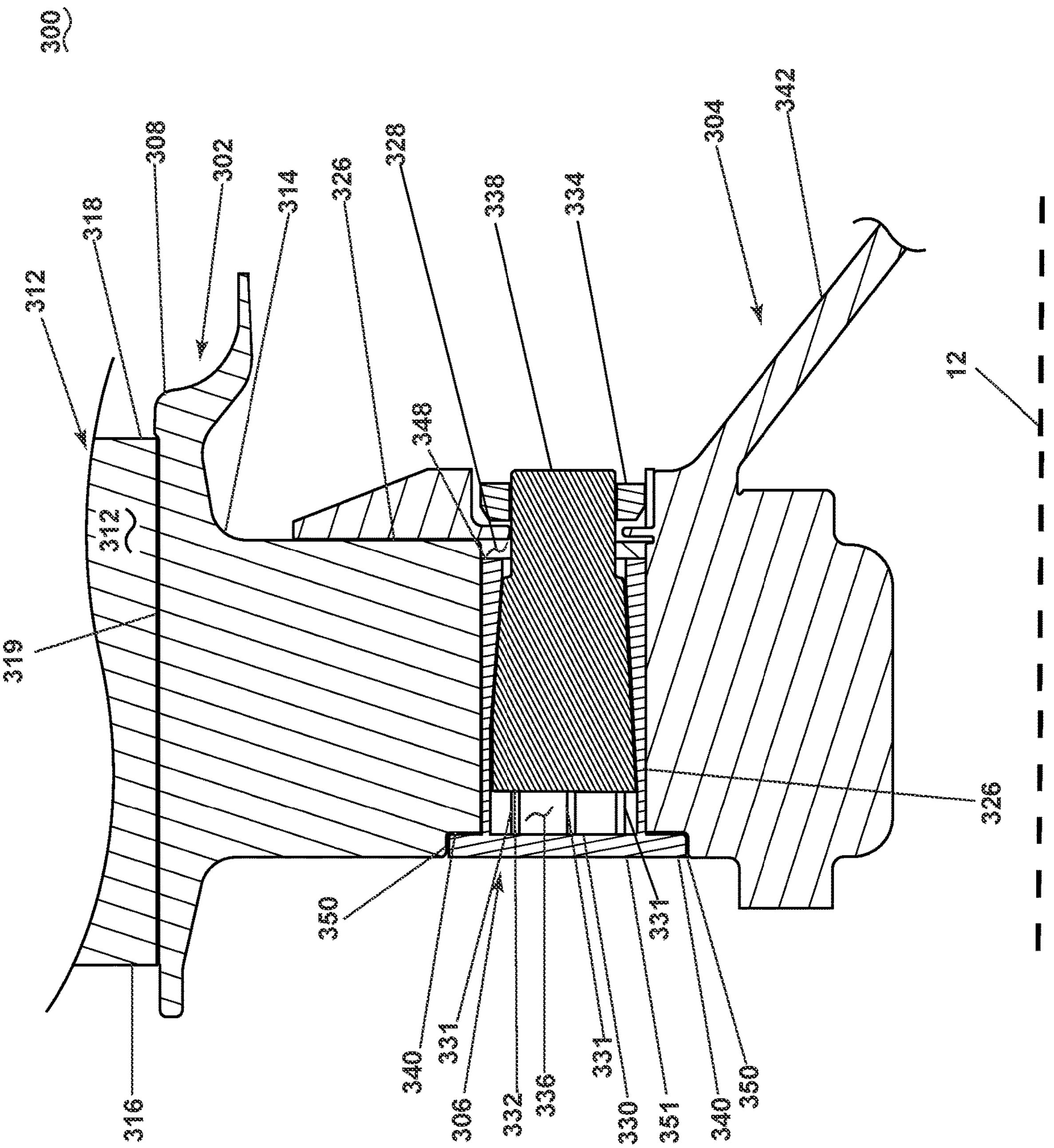
FIG. 7 is a cross-sectional view of an exemplary rotating blade assembly of the gas turbine engine of FIG. 1, further illustrating an exemplary disc and an exemplary retainer assembly including a retainer plate.

FIG. 7 is a cross-sectional view of an exemplary rotating blade assembly 300 of the gas turbine engine 10 of FIG. 1. The exemplary rotating blade assembly 300 is similar to the rotating blade assembly 100, 200; therefore, like parts will be identified with like numerals in the 300 series, with it being understood that the description of the like parts of the rotating blade assembly 100, 200 applies to the exemplary rotating blade assembly 300 unless otherwise noted.

The rotating blade assembly 300 can include a blade assembly 302, a disc 304, and a retainer assembly 306 similar to the rotating blade assembly 100, 200. The blade assembly 302, similar to the blade assembly 102, 202, can include a blade 312 extending from a root 319 to a tip (not illustrated), and a leading edge 316 to a trailing edge 318. The root 319 can be coupled to an inner platform 308 of the blade assembly 302, while the tip can be coupled to an outer platform (not illustrated) of the blade assembly 302. A dovetail 314 can depend from the inner platform 308. The disc 304, similar to the disc 104, 204, can define a seat 326. The disc 304 can optionally be operably coupled to a drive shaft through a projection 342. The retainer assembly 306, similar to the retainer assembly 106, 206, can include a bushing 330 with a set of fingers 331, a pin 332 and a fastener 334. The bushing 330 can be formed similar to the bushing 230 as it includes a wall 351 which terminates at radially distal ends to define a shoulder 340. The shoulder 340 can interface with a cutout 350 at least partially formed within a portion of the dovetail 314 and a portion of the disc 304. The bushing 330 can further be defined by a smaller axial length, similar to the bushing 230, when compared to the bushing 130. The pin 332 can be defined by a distal end 338, and the fastener 334 can be secured to the distal end 338. At least a portion of the disc 304 and the dovetail 314 can form a continuous first through hole 328. An interior of the bushing 330 can define a second through hole 336 aligned with the first through hole 328. The pin 332 can be provided at least partially within the second through hole 336 and the first through hole 328. The bushing 330 can extend through a portion of the first through hole 328 and terminate within the first through hole 328 at a termination 348.

The disc 304 is similar to the disc 204 in that is formed to only extend across a radially inner portion of the rotating blade assembly 200. In other words, the disc 204 does not contact or interface with an axially forward portion of the dovetail 314. The difference between the disc 304, and the disc 204, is that the disc 204 includes the first band 222 and the second band 224. The disc 204, however, can be defined as an integral disc 304 in which the first band 122, 222 is integrally formed with the second band 124, 224. In other words, the disc 304 is formed as a monolithic structure that is axially retained to the blade assembly 302 via the retainer assembly 306. The disc 304 can further be radially retained through use of any suitable radial retention assembly as described herein (e.g., the tail 254 and the socket 256, or the first rib 144 and the second rib 146).

Figure 8:
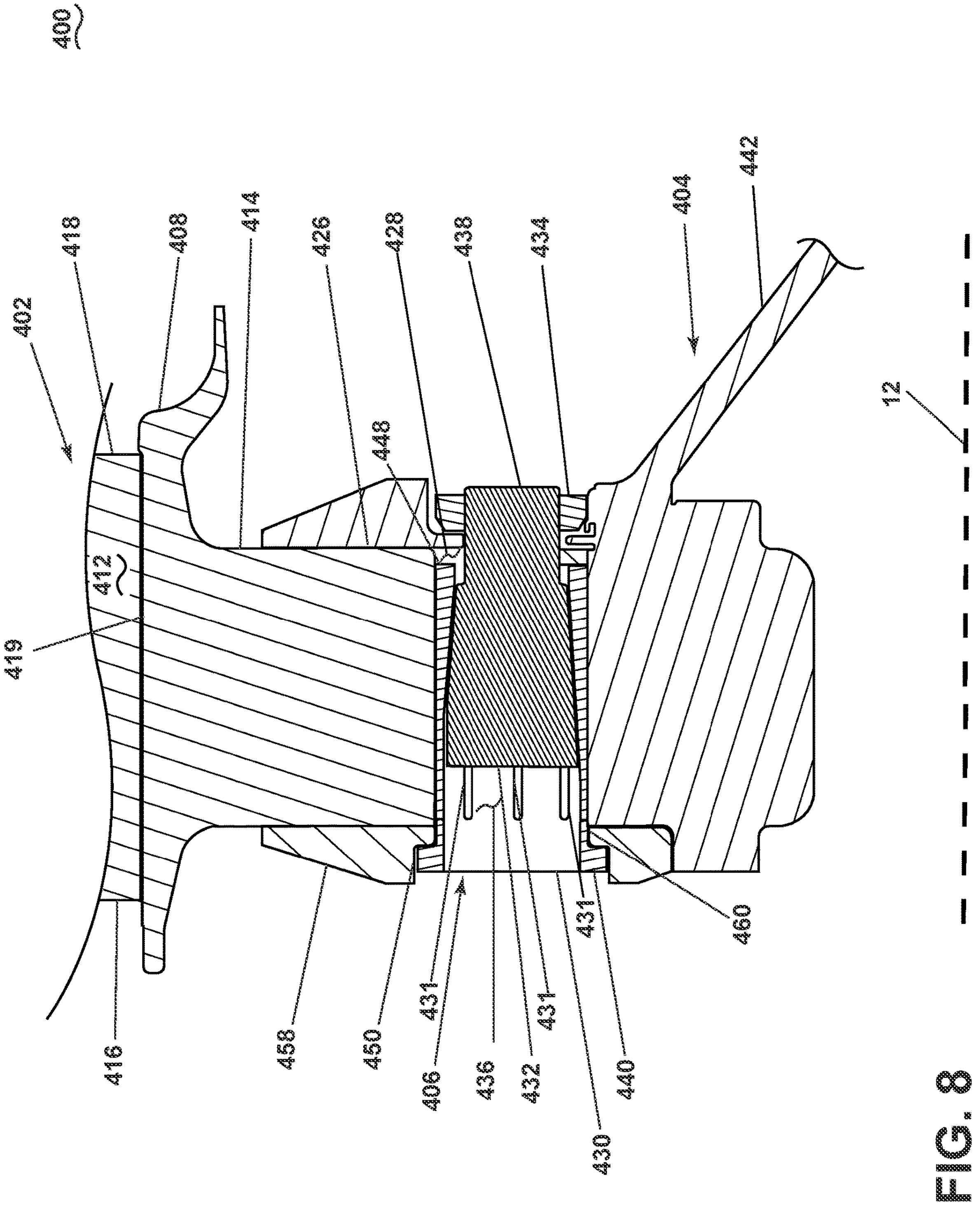
FIG. 8 is a cross-sectional view of an exemplary rotating blade assembly of the gas turbine engine of FIG. 1, further illustrating an exemplary disc and an exemplary retainer assembly including a retainer plate.

FIG. 8 is a cross-sectional view of an exemplary rotating blade assembly 400 of the gas turbine engine 10 of FIG. 1. The exemplary rotating blade assembly 400 is similar to the rotating blade assembly 100, 200, 300; therefore, like parts will be identified with like numerals in the 400 series, with it being understood that the description of the like parts of the rotating blade assembly 100, 200, 300 applies to the exemplary rotating blade assembly 400 unless otherwise noted.

The rotating blade assembly 400 can include a blade assembly 402, a disc 404, and a retainer assembly 406 similar to the rotating blade assembly 100, 200, 300. The blade assembly 402, similar to the blade assembly 102, 202, 302, can include a blade 412 extending from a root 419 to a tip (not illustrated), and a leading edge 416 to a trailing edge 418. The root 419 can be coupled to an inner platform 408 of the blade assembly 402, while the tip can be coupled to an outer platform (not illustrated) of the blade assembly 402. A dovetail 414 can depend from the inner platform 408. The disc 404, similar to the disc 104, 204, 304, can define a seat 426. The disc 404 can optionally be operably coupled to a drive shaft through a projection 442. The disc 404 can be formed similar to the disc 304 in that it is an integral disc 404. The retainer assembly 406, similar to the retainer assembly 106, 206, 306, can include a bushing 430, a pin 432 and a fastener 434. The bushing 430 can be formed similar to the bushing 130, 230, 330 in that it includes a shoulder 440 and a set of fingers 431. The pin 432 can be defined by a distal end 438, and the fastener 434 can be secured to the distal end 438. At least a portion of the disc 404 and the dovetail 414 can form a continuous first through hole 428. An interior of the bushing 430 can define a second through hole 436 aligned with the first through hole 428. The pin 432 can be provided at least partially within the second through hole 436 and the first through hole 428. The bushing 430 can extend through a portion of the first through hole 428 and terminate within the first through hole 428 at a termination 448.

The retainer assembly 406 can further include a retainer plate 458. The retainer plate 458 can abut a portion of the dovetail 414 and the disc 404. The retainer plate 458, similar to the disc 104, 204, 304 and the dovetail 214, 314 can include a cutout 450 configured to receive the shoulder 440 of the bushing 430. The retainer plate 458 can further include a through hole 460 that extends axially through a portion of the retainer plate 458. The retainer plate 458 can be aligned with first through hole 428 such that the through hole 460 defines a portion of the first through hole 428.

During assembly of the rotating blade assembly 400, at least closing force, or the axial retention force generated by the retainer assembly 406 can be applied to the retainer plate 458. As such, the retainer plate 458 can be used to axially retain the disc 404 to the blade assembly 402.

Figure 9:
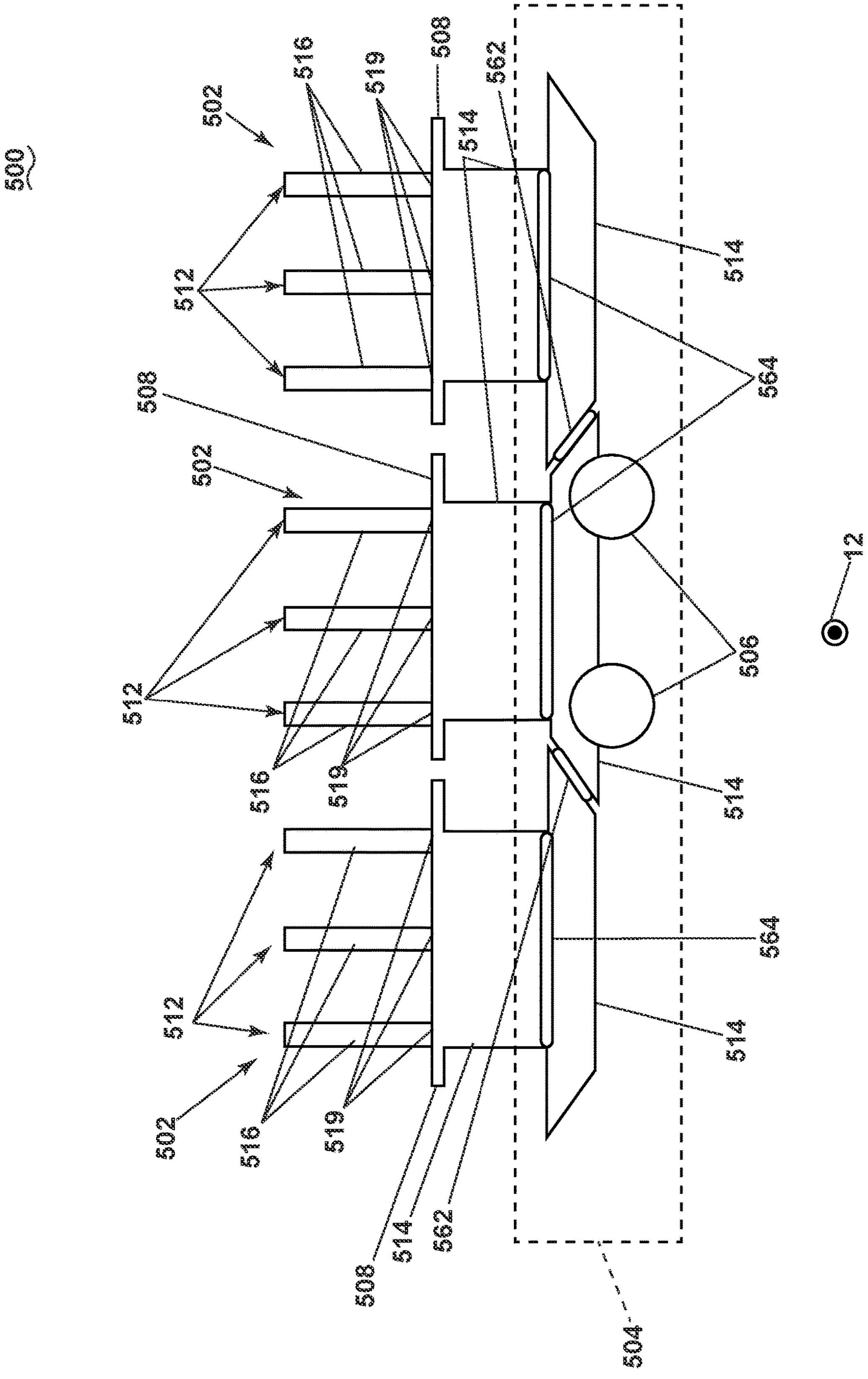
FIG. 9 is a schematic axial view of an exemplary rotating blade assembly of the gas turbine engine of FIG. 1, further including an exemplary disc and a set of retainers provided along a portion of the disc corresponding to every other blade assembly.

FIG. 9 is a schematic axial view of an exemplary rotating blade assembly 500 of the gas turbine engine 10 of FIG. 1. The exemplary rotating blade assembly 500 is similar to the rotating blade assembly 100, 200, 300, 400; therefore, like parts will be identified with like numerals in the 500 series, with it being understood that the description of the like parts of the rotating blade assembly 100, 200, 300, 400 applies to the exemplary rotating blade assembly 500 unless otherwise noted.

The rotating blade assembly 500 can include a set of blade assemblies 502, a disc 504, and a set of retainer assemblies 506 similar to the rotating blade assembly 100, 200, 300, 400. Each blade assembly 502 of the set of blade assemblies 502 can be similar to the blade assembly 102, 202, 302, 402. Each blade assembly 502 can include a blade 512 or a set of blades 512, with each blade 512 extending from a root 519 to a tip (not illustrated), and a leading edge 516 to a trailing edge (not illustrated). The root 519 can be coupled to an inner platform 508 of the blade assembly 502, while the tip can be coupled to an outer platform (not illustrated) of the blade assembly 502. Each blade assembly 502 can include a dovetail 514 that can depend from the corresponding inner platform 508 of the blade assembly 502. The disc 504, as illustrated, is a schematic illustration of the disc 504. It will be appreciated, however, that the disc 504 can be any suitable disc 104, 204, 304, 404 as disclosed herein. The set of retainer assemblies 506, as illustrated, is a schematic illustration of the retainer assembly 506. It will be appreciated, however, that each retainer assembly 506 of the set of retainer assemblies 506 can include any suitable retainer assembly 106, 206, 306, 406 as described herein.

As illustrated, the set of blade assemblies 502 can each include a corresponding dovetail 514. Each dovetail 514 can be formed such that it is complementary to an adjacent dovetail 514. A first contact region 562 can be formed between corresponding portions of adjacent dovetails 514. The first contact region 562 can denote a region where adjacent dovetails 514 physically contact one another or are otherwise coupled to each other. Further, each dovetail 514 can be contacted by a portion of the disc 504. As a non-limiting example, each dovetail 514 can be contacted by the disc 504 along a second contact region 564. As a non-limiting example, the second contact region 564 can be the contact or interface between the first rib 144 or the second rib 146 of the rotating blade assembly 100. As a non-liming example, the second contact region 564 can be the contact or interface between the tail 254 and the socket 256 of the rotating blade assembly 200.

It is contemplated that the set of retainer assemblies 506 can be arranged in groups. As a non-limiting example, the set of retainer assemblies 506 can include a group of two retainer assemblies 506. It will be appreciated, however, that each group of retainer assemblies 506 can include any number of one or more retainer assemblies 506. As illustrated, each group of retainer assemblies 506 of the set of retainer assemblies 506 can extend through a portion of the disc 504 corresponding to every other blade assembly 502. In other words, every other blade assembly 502 can be physically coupled to a retainer assembly 506 of the set of retainer assemblies 506. This configuration can reduce the total number of retainer assemblies 506 needed in order to effectively couple the disc 504 to the set of blade assemblies 502. Alternatively, the retainer assemblies 506 can be spread out over any number of blade assemblies 502. As a non-limiting example, the set of retainer assemblies 506 can be provided along a portion of the disc 504 corresponding to every third, fourth, fifth, or $n^{th}$ blade assembly 502. Alternatively, the set of retainer assemblies 506 can be provided along the disc 504 corresponding to every blade assembly 502 in the set of blade assemblies 502.

Benefits of the present disclosure include a rotating blade assembly that can be used with a turbine engine (e.g., a counter-rotating turbine engine), which has an overall improved efficiency when compared to a conventional turbine engine (e.g., a non-counter-rotating turbine engine). For example, conventional turbine engines can include a set of rotating blades provided downstream of set of stationary vanes, which together form a stage of the non-counter-rotating turbine engine. During operation of the non-counter-rotating turbine engine, a working airflow, similar to the working airflow as described herein, can flow over the set of stationary vanes and subsequently to the set of adjacent rotating blades. The set of stationary vanes can be used to direct the working airflow such that it is incident with that leading edge of the set of rotating blades, thus limiting the windage losses associated with a non-incident working airflow. In a non-counter-rotating turbine engine, however, work is only extracted through the rotation of the set of rotating blades (e.g., the set of stationary vanes do not extract work from the working airflow). The present disclosure, however, is concerned with a rotating blade assembly for a counter-rotating turbine engine in which a stage is made up of two adjacent rotating blade assemblies. It is contemplated that the adjacent rotating blade assemblies can rotate in counter (e.g., opposite) circumferential directions with respect to one another, however, the rotating blade assemblies can be positioned such that the working airflow leaving the upstream rotating blade assembly can be incident with respect to their own leading edges. As such, windage losses are still avoided or otherwise limited, however, work can be extracted from both sets of rotating blade assemblies. This ultimately means that the total work output from the counter-rotating turbine engine can be larger when compared to a non-counter-rotating turbine engine of similar size (e.g., similar or same amount of total stages).

Further benefits of the present disclosure include a rotating blade assembly with reduced losses when compared to a rotating blade assembly used within a counter-rotating turbine engine without the disc as described herein. For example, a rotating blade assembly without the disc as described herein will form a non-rigid circumferential ring of blade assemblies within the working airflow. This, in turn, means that the blade assemblies have larger tolerances for how much they can move during the intended circumrenal movement (e.g., rotation) of the rotating blade assembly. The larger tolerances, in turn, cause the inner portions of the rotating blade assembly and the outer band will be non-concentric, which ultimately generates losses. The rotating blade assembly, as described herein, however, includes a circumferential disc that interconnects each of the blade assemblies within the rotating blade assembly. In other words, the disc can be used to form a rigid structure between adjacent blade assemblies. This, in turn, reduces or eliminates the clearances between adjacent components, which ensures the concentricity between the disc and the outer platform as described herein. The concentric rotation and assembly of the rotating blade assembly with respect to the outer band, in turn, minimizes the losses that are generated, which ultimately increases the efficiency of the rotating turbine engine when compared to a conventional rotating turbine engine without the rotating blade assembly as described herein.

Further benefits of the present disclosure include a rotating blade assembly within the counter-rotating turbine engine having an increased frictional damping capabilities when compared to a conventional rotating blade assembly used within a counter-rotating turbine engine. For example, conventional rotating blade assemblies can use a monolithic structure interconnecting adjacent blade assemblies. In other words, conventional rotating blade assemblies can include a single inner band, formed as a single unitary piece that is integral with the remainder of the rotating blade assembly. The monolithic structure, however, has low frictional damping capabilities as there is a no contact surface between adjacent components. As such, the conventional rotating blade assembly will vibrate, which in turn increases the total losses associated with the operation of the conventional counter-rotating turbine engine. The counter-rotating turbine engine, as described herein, however, includes a non-monolithic rotating blade assembly. As a non-limiting example, the counter-rotating turbine engine, as described herein, can include a non-monolithic disc that is coupled to and contacts the remainder of the rotating blade assembly along various contact regions generated by the interface between the remainder of the rotating blade assembly and the disc (e.g., the fastener assembly, the ribs, and the tails/sockets). These contact regions can create areas of frictional contact between two adjacent portions in the rotating blade assembly. This, in turn, enhances the frictional damping capabilities of the rotating blade assembly when compared to the conventional rotating blade assembly. This reduces the vibration losses associated with the operation of the counter-rotating turbine engine when compared to the conventional counter-rotating turbine engine, which ultimately increases the overall efficiency of the counter-rotating turbine engine when compared to the conventional counter-rotating turbine engine.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses.

A rotating blade assembly for a turbine engine having a drive shaft, the rotating blade assembly comprising a disc operably coupled to the drive shaft and including a seat having at least a portion of a first through hole, at least one blade assembly having an upper platform, a lower platform, a dovetail extending from the lower platform, and a blade extending between the upper platform and the lower platform, and a retainer assembly securing the disc to the blade assembly, the retainer assembly comprising a hollow tubular element defining a second through hole, which is aligned with the first through hole, and a pin extending through at least a portion of the second through hole and the first through hole, and confronting at least a portion of the hollow tubular element.

The rotating blade assembly of any preceding clause, wherein the hollow tubular element is an expandable bushing.

The rotating blade assembly of any preceding clause, wherein the pin terminates at a distal end and the rotating blade further comprises a fastener secured to the distal end and abutting the disc.

The rotating blade assembly of any preceding clause, wherein the fastener is one of a nut, a hydraulic fastener, a magnetic fastener, a weld, an adhesive, or an electrical connection.

The rotating blade assembly of any preceding clause, wherein the fastener is the nut and the pin includes a threaded section, wherein the nut is threaded onto the threaded section of the pin.

The rotating blade assembly of any preceding clause, wherein the dovetail defines at least another portion of the first through hole.

The rotating blade assembly of any preceding clause, wherein the disc further comprises a first band and a second band that together define the seat.

The rotating blade assembly of any preceding clause, wherein the first band and the second band are coupled at a lap joint.

The rotating blade assembly of any preceding clause, wherein the first band includes a first rib and the second band includes a second rib, with both the first rib and the second rib confronting a corresponding portion of the dovetail.

The rotating blade assembly of any preceding clause, wherein the retainer assembly further comprises a retainer plate including a through hole aligned with the first through hole and abutting a portion of the disc and the dovetail.

The rotating blade assembly of any preceding clause, wherein hollow tubular element further comprises a first end including a shoulder, with the shoulder abutting a corresponding portion of the retainer plate.

The rotating blade assembly of any preceding clause, wherein the hollow tubular element further comprises a shoulder abutting at least one of the disc or the dovetail.

The rotating blade assembly of any preceding clause, wherein the disc includes a dovetail connection extending from a remainder of the disc in the span-wise direction, and extends through a corresponding portion of the dovetail.

The rotating blade assembly of any preceding clause, wherein the disc extends continuously about the drive shaft 360 degrees.

A gas turbine engine, comprising an engine core defining an engine centerline and comprising drive shaft and a first rotor, and a rotating blade assembly, comprising a disc operably coupled to the drive shaft and including a seat having at least a portion of a first through hole, at least one blade assembly having an upper platform operably coupled to the first rotor, a lower platform, a dovetail extending from the lower platform, and a blade extending between the upper platform and the lower platform, and at least one retainer assembly securing the disc to the at least one blade assembly, the at least one retainer assembly comprising a hollow tubular element defining a second through hole, which is aligned with the first through hole, and a pin extending through at least a portion of the second through hole and the first through hole, and confronting at least a portion of the hollow tubular element.

The gas turbine engine of any preceding clause, wherein the at least one blade assembly is included within a set of blade assemblies circumferentially spaced with respect to one another and that extend circumferentially about an entirety of the engine centerline, and wherein the disc is a 360 degree ring that extends circumferentially about each dovetail of the set of blade assemblies.

The gas turbine engine of any preceding clause, wherein the at least one retainer assembly is included with a set of retainer assemblies, and wherein the set of retainer assemblies are provided along the disc at circumferential positions corresponding to every other blade assembly, and wherein at least two adjacent blade assemblies define a socket extending at least partially through each dovetail, and wherein the disc further comprises a tail extending from the remainder of the disc and at least partially received within the socket.

The gas turbine engine of any preceding clause, further comprising an outer rotor spaced radially outwardly from the first rotor with respect to the engine centerline.

The gas turbine engine of any preceding clause, wherein the disc further comprises a first band including a first rib confronting the dovetail, the first band defining a first portion of the seat, and a second band including a second rib confronting the dovetail, the second band defining a second portion of the seat wherein the first rib and the second rib radially retain the disc to the dovetail.

The gas turbine engine of any preceding clause, wherein the hollow tubular element is an expandable bushing, the expandable bushing further comprising a shoulder abutting at least one of the disc or the dovetail, and wherein the pin terminates at a distal end, the at least one retainer assembly further comprises a retainer plate including a through hole aligned with the first through hole and abutting a portion of the disc and the dovetail, and at least one fastener secured to the distal end and abutting the disc.

What is claimed is:

1. A rotating blade assembly rotatable about a rotational axis, the rotating blade assembly comprising:

a disc including a seat having at least a portion of a first through hole;

a blade assembly having an upper platform, a lower platform, a dovetail extending from the lower platform, and a blade extending between the upper platform and the lower platform; and a retainer assembly securing the disc to the blade assembly, the retainer assembly comprising:

an expandable hollow tubular element defining a second through hole, which is aligned with the first through hole, the expandable hollow tubular element including a tubular wall and a plurality of fingers extending axially, with respect to the rotational axis; and a pin extending through at least a portion of the second through hole and the first through hole, and confronting at least a portion of the expandable hollow tubular element.

2. The rotating blade assembly of claim 1, wherein the expandable hollow tubular element is an expandable bushing.

3. The rotating blade assembly of claim 1, wherein the pin terminates at a distal end and the rotating blade assembly further comprises a fastener secured to the distal end and abutting the disc.

4. The rotating blade assembly of claim 1, wherein the disc further comprises a first band and a second band that together define the seat.

5. The rotating blade assembly of claim 4, wherein the first band and the second band are coupled at a lap joint.

6. The rotating blade assembly of claim 4, wherein the first band includes a first rib and the second band includes a second rib, with both the first rib and the second rib confronting a corresponding portion of the dovetail.

7. The rotating blade assembly of claim 1, wherein the retainer assembly further comprises a retainer plate including a through hole aligned with the first through hole and abutting a portion of the disc and the dovetail.

8. The rotating blade assembly of claim 1, wherein the expandable hollow tubular element further comprises a shoulder abutting at least one of the disc or the dovetail.

9. The rotating blade assembly of claim 1, wherein the disc includes a dovetail connection extending from a remainder of the disc in a span-wise direction, and extends through a corresponding portion of the dovetail.

10. The rotating blade assembly of claim 1, wherein the expandable hollow tubular element includes an expandable material.

11. The rotating blade assembly of claim 1, wherein the expandable hollow tubular element contacts a respective portion of the dovetail.

12. A gas turbine engine, comprising:

an engine core defining an engine centerline and comprising a drive shaft and a first rotor; and the rotating blade assembly of claim 1, with the disc being operably coupled to the drive shaft.

13. The gas turbine engine of claim 12, wherein the blade assembly is included within a plurality of blade assemblies circumferentially spaced with respect to one another, and wherein the disc is a 360 degree ring that extends circumferentially about a respective portion of each blade assembly of the plurality of blade assemblies.

14. The gas turbine engine of claim 12, wherein:

the blade assembly is included within a plurality of blade assemblies;

the retainer assembly is included within a plurality of retainer assemblies securing the disc to the plurality of blade assemblies, the plurality of retainer assemblies being provided along the disc at circumferential positions corresponding to every other blade assembly of the plurality of blade assemblies;

at least two adjacent blade assemblies of the plurality of blade assemblies include respective dovetails, with at least a portion of the respective dovetails being circumferentially spaced to define a socket therebetween; and the disc comprises a tail at least partially received within the socket.

15. The gas turbine engine of claim 12, further comprising a second rotor spaced radially outwardly from the first rotor with respect to the engine centerline.

16. A rotating blade assembly rotatable about a rotational axis, the rotating blade assembly comprising:

a disc including a seat having at least a portion of a first through hole;

a blade assembly having an upper platform, a lower platform, a dovetail extending from the lower platform, and a blade extending between the upper platform and the lower platform; and a retainer assembly securing the disc to the blade assembly, the retainer assembly comprising:

an expandable hollow tubular element defining a second through hole, which is aligned with the first through hole, the expandable hollow tubular element including a tubular wall defining the second through hole, the tubular wall having a first section with an increased cross-sectional area to define a portion of the second through hole with a decreased cross-sectional area when viewed along a plane extending along the rotational axis and intersecting the expandable hollow tubular element; and a pin extending through at least a portion of the second through hole and the first through hole, and confronting at least a portion of the expandable hollow tubular element, the pin having a second section with a decreasing cross-sectional area when viewed along a plane extending along the rotational axis and intersecting the pin.

17. The rotating blade assembly of claim 16, wherein the pin is a conical pin and the expandable hollow tubular element is a conical hollow tubular element, the conical pin forming an interface with the conical hollow tubular element.

18. The rotating blade assembly of claim 16, wherein the first section forms an interface with the second section.

19. The rotating blade assembly of claim 16, wherein the expandable hollow tubular element is an expandable bushing.

20. A rotating blade assembly for a turbine engine having a drive shaft, the rotating blade assembly comprising:

a disc operably coupled to the drive shaft and including a seat having at least a portion of a first through hole, the disc including a dovetail connection extending from a remainder of the disc in a span-wise direction;

a blade assembly having an upper platform, a lower platform, a dovetail extending from the lower platform, and a blade extending between the upper platform and the lower platform, the dovetail connection extending through a corresponding portion of the dovetail; and a retainer assembly securing the disc to the blade assembly, the retainer assembly comprising:
a hollow tubular element defining a second through hole, which is aligned with the first through hole; and
a pin extending through at least a portion of the second through hole and the first through hole, and confronting at least a portion of the hollow tubular element.

* * * * *